United States Patent Office 3,495,474
Patented Feb. 17, 1970

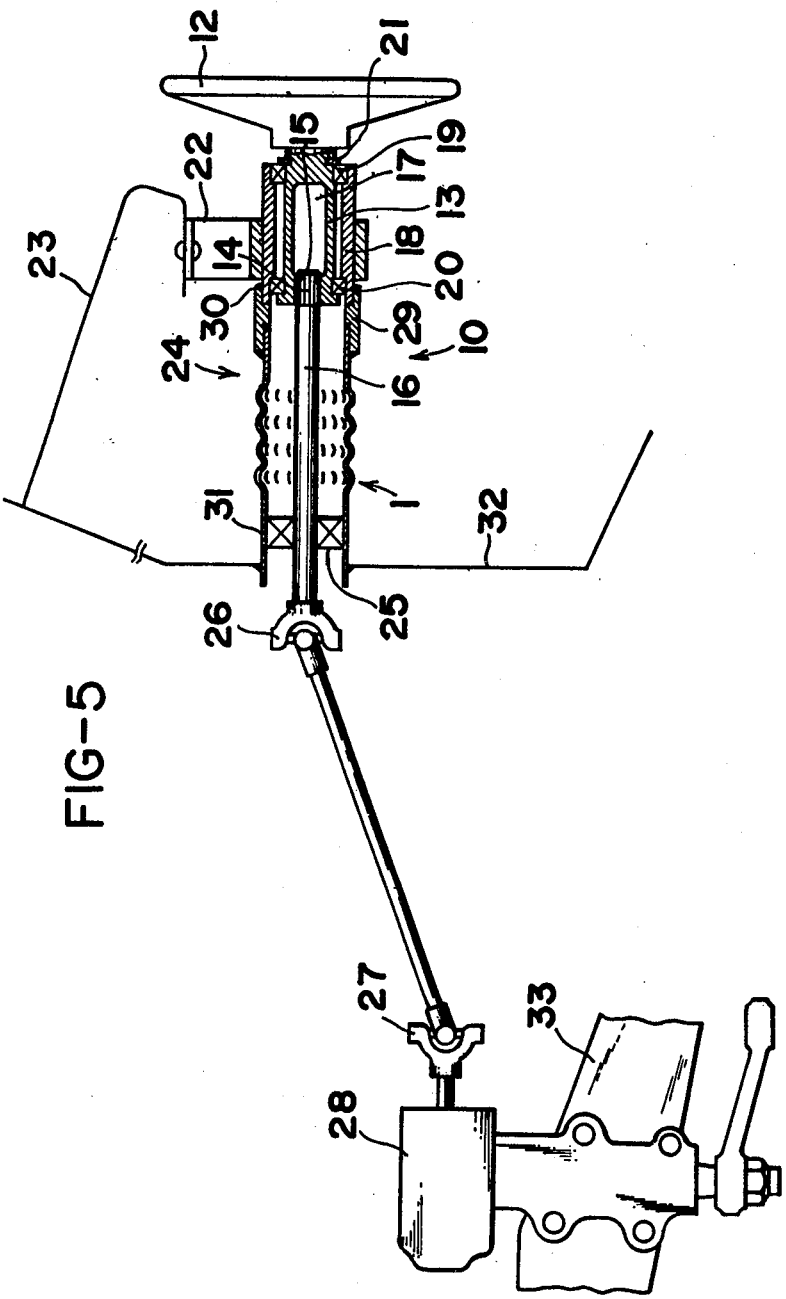

3,495,474
IMPACT ABSORBING MEANS FOR VEHICLES
Yoshihiro Nishimura, Kamakura, and Mitsutake Okino, Yokohama, Japan, assignors to Nissan Jidosha Kabushiki Kaisha, Yokohama, Japan
Filed Oct. 3, 1967, Ser. No. 672,530
Claims priority, application Japan, Nov. 24, 1966, 41/107,311
Int. Cl. B62d 1/18; B60r 19/08
U.S. Cl. 74—492          3 Claims

ABSTRACT OF THE DISCLOSURE

Impact absorbing means which is available to safety devices for vehicles comprising a bellows or corrugated metal tube having a plurality of longitudinal slits to the projected portions thereof, and which is suitable as plastically deformable impact absorbing means to absorb impact caused by the human body or by other obstacles in case of collision or the like.

---

The present invention relates to impact absorbing means for vehicles and more particularly, to plastically deformable impact absorbing means available to safety devices for vehicles.

In case of collision of a vehicle with an obstacle, there might be a great danger to the vehicle personnel by the impact force causing the vehicle operator to be thrown forwardly against the steering wheel and also causing the other personnel to be propelled against the vehicle portions. It is desirable to provide impact absorbing means to the steering assembly and/or to vehicle body portions such as the bumper preferably by plastically deformable impact absorbing means as a safety device to eliminate or at least mitigate such danger.

Accordingly, a primary object of the invention is to provide impact absorbing means for a vehicle to absorb impact energy by positive plastic deformation in case of collision or the like thereby serving as a safety device for vehicle personnel.

Another object of the invention is to provide impact absorbing means which are simple and reliable in operation.

A further object of the invention is to provide a steering assembly including the above mentioned impact absorbing means to absorb impact energy applied to the steering wheel portion by the vehicle operator's body.

A still further object of the invention is to provide bumper means for a vehicle including the above mentioned impact absorbing means to absorb impact energy applied to the vehicle so as to protect vehicle personnel from injury.

According to general features of the present invention, a plastically deformable impact absorbing means is provided for a vehicle comprising a bellows or corrugated metal tubular member forming axially spaced projections having a plurality of slits disposed longitudinally and substantially parallel to each other on the periphery of each projection, so that impact energy is absorbed by plastic deformation of the corrugated tubular member when an axial compressive force is applied.

The impact absorbing means according to the invention enables it to absorb impact energy applied as a compressive force acting axially on the corrugated tubular member by plastic deformation thereof. By providing a plurality of slits disposed axially and parallel to each other on the periphery of the projections, according to the invention, various impact absorbing means having desired properties are easily manufactured from conventional corrugated steel tubes and these properties are accurately determined easily such as by number and depth of the slits.

Further and more specific objects, features and advantages of the invention and the manner in which the invention is carried into practice are made apparent in the following detailed description of preferred embodiments by way of example, wherein reference is made to the accompanying drawings, in which.

Figure 1:
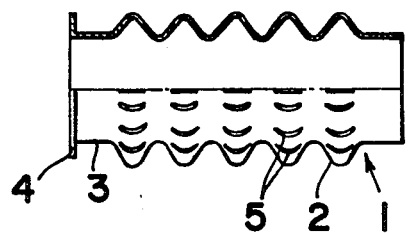
FIG. 1 shows a partially sectioned longitudinal view of plastically deformable impact absorbing means according to the invention.
Figure 2:
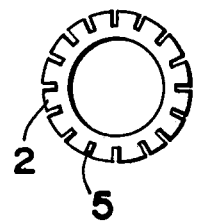
FIG. 2 shows an end view of the impact absorbing means shown in FIG. 1.
Figure 3:
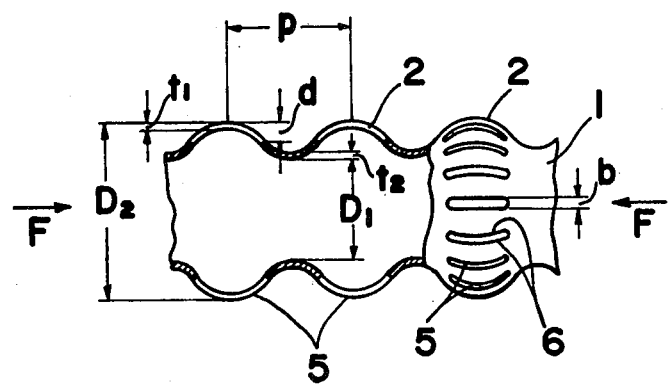
Figure 4:
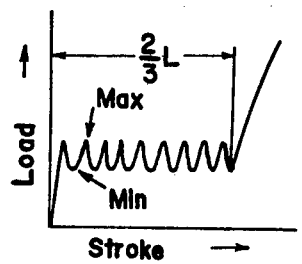

FIG. 3 shows an enlarged fragmental view of the impact absorbing means shown in FIGS. 1 and 2, FIG. 4 shows a load-stroke diagram of the impact absorbing means shown in FIGS. 1 through 3, FIG. 5 shows diagrammatically a longitudinal sectional view of a steering assembly which is a preferred application of the impact absorbing means shown in FIGS. 1 through 3, and FIG. 6 shows diagrammatically a horizontal sectional view of a bumper mounting which is a second preferred application of the impact absorbing means shown in FIGS. 1 through 3.

Referring now to the drawing particularly to FIGS. 1 through 3, showing one preferred embodiment of the impact absorbing means according to the present invention, 1 designates generally a plastically deformable impact absorbing member which is a metal tubular member preferably of steel, having spaced radial projections 2 to the axial direction forming a bellows or corrugated tube. Substantially flat portions 3 are formed or secured to the both ends of the member 1 to facilitate mounting to desired parts. A flange 4 may be formed or secured as necessary to one or each end of the member (only one is shown) also to facilitate mounting. A plurality of slits 5 are provided in the projections 2 extending to the axial direction of the impact absorbing member 1 and being parallel to each other. As shown in the drawings, the slit walls terminate in semi-circular ends or as hereinafter described, rounded fillets. These slits may be formed by machining a formed corrugated tubular member. However, for production purpose, slits may be punched on a flat sheet metal, then the sheet metal is formed to a corrugated tube by conventional process. In this case, longitudinal edges 6 of each slit 5 may not be exactly parallel to each other, but practically no adverse effect appears in operation.

In operation, if an axial impact force as shown by arrows F in FIG. 3, is applied to the impact absorbing member 1, the projections 2 will be plastically deformed absorbing the applied impact energy without practically any harmful reactional force, as the projections 2 are weakened by the slits 5 extending longitudinal on the projections 2.

The axial force F causing plastic deformation of the impact absorbing member 1, will be determined easily to a desired value, for a corrugated tube having minimum inside diameter $D_1$, maximum outside diameter $D_2$, pitch of projections $p$ and thickness of sheet metal $t_1$ and $t_2$, determining the values of slits, i.e. width of slit $b$, depth of slit $d$ and number of slits per projection $a$. Thus, properties of the impact absorbing member 1 can be precisely determined very easily to a desired value.

The impact absorbing means 1 is available as an impact absorbing member of a steering assembly of a vehicle serving to absorb impact energy caused by human body in case of collision or the like, as a preferred embodiment of the present invention by way of example. A more practical data in this case will be now described.

The material used in a seamed mild steel pipe of Japanese Standard JIS–STKM–30, of diameter $D_1$=38.1 mm., thickness $t_2$=1.0 mm. The steel pipe is formed to a corrugated tube having outside diameter $D_2$=47 mm., pitch $p$=15 mm., total length of corrugated portion $L$=270 mm., having 10 slits of width 2 mm. equally spaced to the periphery of the corrugated or projected portions.

Compression test of such a corrugated tube by axial load is represented as a load-stroke diagram as shown in FIG. 4. As the stroke increases the load does not increase as compression of spring means, and fluctuate between substantially equal values of maximum and minimum, plastically deforming the corrugated portions. When the stroke reaches to a point of about ⅔L, the load suddenly increases showing that the adjacent walls of the corrugated portions substantially contact each other and the impact absorbing member now is a collapsed rigid member and acts no more as an impact absorber. The long range of stroke i.e. ⅔L, showing substantially flat and relatively low load range can be utilized as impact absorbing range, absorbing the applied axial force by plastic deformation of the corrugated portion without any harmful reactional force.

A typical result of static axial compression tests of the corrugated tube above described without (tube $a$) and with (tube $b$) slits was as follows:

| Tube: | Max. load, kg. | Min. load, kg. | Energy absorbed, kg. m. |
|---|---|---|---|
| a | 600 | 350 | 108–63 |
| b | 350 | 180 | 63–32 |

As clearly shown, a relatively rigid corrugated tube having sufficient strength and rigidity to both end portions to facilitate mounting to adjacent parts of the steering assembly or the vehicle body portion can be accommodated to relatively low impact force caused by human body, by providing slits to the periphery of the projections according to the invention. The properties of the tube $b$ having the slits can be easily accurately determined to a desired value, by determining the number and depth of the slits, as described above.

The effective stroke in this case is ⅔$L$=180 mm. The rather long stroke of the impact absorbing member which gradually absorbs applied impact energy ensures efficient and safe impact absorbing effect as a safety device of vehicles.

FIG. 5 shows an exemplified application of the plastically deformable impact absorbing means 1 shown in FIGS. 1 through 3, which is mounted to a steering assembly 10 of a vehicle for absorbing impact energy caused by human body, in the event of an occurrence such as collision of the vehicle causing the operator to be thrown forwardly to a steering wheel 12 of the steering assembly 10.

The steering wheel 12 is secured to an upper steering column shaft 13 forming an inside serrated portion 14 slidably engaging to an outer serrated portion 15 of a lower steering column shaft 16. The upper steering column shaft 13 forms a hollow space 17 having sufficient depth to accommodate the serrated end 15 of the lower steering column shaft 16 if the upper portion of the steering assembly 10 is displaced downward or leftward of FIG. 5, in case of collision or the like as will be described more fully hereinafter.

The upper steering column shaft 13 is rotatably supported by an upper jacket tube 18 through bearings 19 and 20 and a retainer ring 21. The upper jacket tube 18 is supported and aligned by an upper clamp member 22 which is secured to a relatively rigid vehicle body portion through a relatively rigid support bracket 23. The support between the upper jacket tube 18 and the upper clamp member 22 permits axial displacement of the upper jacket tube 18 and also may include bushing means to facilitate the displacement.

The lower steering column shaft 16 is supported by a lower jacket tube 24 through bearing means 25 and connected to the lower end a pair of universal joint means 26 and 27 which are in turn connected to steering gear means (not shown) disposed in a steering gear box 28 which is secured to a portion 33 of vehicle body following conventional practice.

An upper portion 29 of the lower jacket tube is secured to the upper jacket tube 18 by conventional practice such as screws (not shown) and forms a shoulder portion 30 abutting to the lower end of the upper jacket tube 18 to prevent upward or rightward displacement of the steering assembly 10 relative to the clamp member 22. A lower portion 31 of the lower jacket tube 24 is secured to the dash panel 32 which is integral to the vehicle body. An impact absorbing member 1 as shown in FIGS. 1 through 3 is inserted between the upper and lower portions 29 and 31. Thus, an axial impact force applied to the member 1 through the steering wheel is supported by the lower portion 31 which is secured to the vehicle body, so that the axial impact force is applied to the impact absorbing means to cause plastic deformation thereof.

Operations of the steering assembly 10 and also of the impact absorbing means 1 will now be explained in more detail. The steering assembly obviously controls the vehicle in the same manner as conventional steering control systems in ordinary operation. In case of an occurrence such as a collision, if the operator's body is thrown forwardly, the impact energy is applied to the steering wheel 12 through hands or body portions of the operator. The impact energy will force the steering wheel leftward or downward causing axial relative displacement between the inside serrated portion 14 of the upper steering column shaft 13 and the outside serrated portion 15 of the lower steering column shaft 16, and also between the outside surface of the upper jacket tube 18 and the inside surface of the upper clamp member 22, both are easily displaced as described heretofore. Thus the impact force is applied to the upper end of the impact absorbing member 1 through the upper portion 29 of the lower jacket tube 24, while the lower portion 31 is secured to the dash panel 32. The applied impact force which is caused by the operator's body is absorbed by the impact absorbing member 1 causing plastic deformation of the slitted projections 2 as described heretofore referring to FIGS. 1 through 3.

In the event of an occurrence such as a collision to an obstacle, if the forward portion of the vehicle is destroyed resulting in an upward or rightward displacement of the lower steering column shaft 16, such displacement causes only relative displacement between the outer serrated portion 15 at the upper end of the lower steering column shaft 16 and the inside serrated portion 14 at the lower end of the upper steering column shaft 13 so that no harmful effect or secondary damage is induced to the upper portion of the steering assembly, thus the operator will be protected from injury. When the bearing 25 supporting the lower steering column shaft 16 is very tight, the impact energy applied to the lower steering column shaft might cause deformation of the dash panel 32 and the tightly secured lower portion 31 of the lower jacket tube 24. The deformation may cause axial displacement of the impact absorbing member 1 resulting in collapse or plastic deformation thereof. Such deformation resembles impact absorbing plastic deformation heretofore described, but the impact energy applied to the lower steering column shaft may be far greater than the impact energy caused by human body, so that the impact absorbing member does not act as an effective impact absorber and acts only as a safety device to prevent from causing secondary damage to the upper portion of the steering assembly 10 which includes shoulder portion 30 of the lower jacket tube 24 abutting to the downward or left side of the clamp member 22 which is secured to a relatively rigid vehicle body portion preventing upward displacement of the upper jacket tube 18 and the steering wheel 12.

As described in detail the plastically deformable impact absorbing member 1 effectively absorbs impact energy caused by the operator's body, while eliminating any effect to cause upward displacement of the upper portion of the steering assembly, thus providing an improved safety device for steering assembly of vehicles. Moreover, the impact energy to be absorbed by the impact absorbing member 1 is limited to the impact force caused by human body so that the properties of the impact absorbing member are easily determined.

Figure 6:
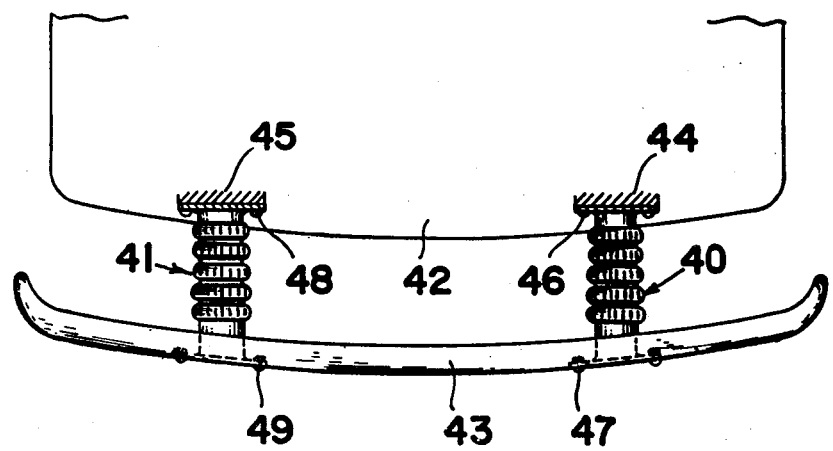

FIG. 6 shows another embodiment of the impact absorbing member shown in FIGS. 1 through 3, utilized as bumper stay members of a vehicle, to absorb impact energy applied to the vehicle in case of collision or the like.

The impact absorbing members 40 and 41 are inserted between forward and/or rear portion 42 of the vehicle and a bumper 43. The impact absorbing members 40 and 41 are more rigid than the member 1 shown in FIG. 5 and may include end flanges such as flange 4 shown in FIG. 1 secured or integral to end portions of the members 40 and 41, and which are secured to relatively rigid frame portions 44 and 45 of the vehicle body 42 and the bumper 43 respectively by suitable means such as screws 46, 47, 48 and 49.

In the event of an occurrence such as collision or the like, if the forward or rear bumper 43 impacts with an obstacle, the impact force is transmitted to the vehicle body 42 through the impact absorbing members 40 and 41. The applied impact energy is absorbed at least partly by plastic deformation of the members 40 and 41, so that possible damage or injury of the vehicle and the vehicle personnel are prevented or at least mitigated.

It will be appreciated that the impact absorbing members 1, 40 and 41, according to the invention eliminate or at least mitigate damage or injury to the vehicle personnel and/or the vehicle in case of collision or the like when the members are suitably provided to the vehicle portion or portions, by plastic deformation of the impact absorbing member or members, consequently the present invention provides a safety device for vehicles.

What we claim is:

1. Impact absorbing means for a vehicle comprising a metal tube, a plurality of projections forming bellows shaped corrugations expanded radially outwards from the metal tube, straight cylindrical end portions at each end of the corrugations and integral with the corrugations, a plurality of longitudinal slits with parallel sides terminating at each end in rounded fillets, the sides being substantially parallel to each other and extending through the top of each expanded portion, the slits on the adjacent projections being aligned with each other, whereby impact energy is absorbed by sequential plastic deformation of each projection when an axial compressive force is applied.

2. Impact absorbing means for a steering assembly of a vehicle comprising steering gear means, a plastically deformable impact absorbing tube means having an intermediate serpentine configuration, the crests of the serpentine configuration having substantially parallel slits with parallel longitudinal walls terminating at each end in rounded fillets, the end portions of the impact absorbing tube means being straight cylinders, the steering assembly comprises an upper and a lower steering column shaft slidably engaging each other, an upper jacket tube means that rotatably supports the upper steering column shaft and is axially slidably supported by a portion of the vehicle, the impact absorbing tube means is mounted to the upper jacket tube means at one end and to a portion of the vehicle at the other end, the lower steering column shaft being rotatably supported by the impact absorbing tube means and having universal joint means between the lower supported portion and the steering gear means connected to the lower end thereof, whereby impact energy is absorbed by sequential plastic deformation of each projection when an axial compressive force, caused by the human body, is applied to the upper steering column shaft.

3. Impact absorbing means for a vehicle steering assembly comprising a plurality of projections without sharp corners forming bellows shaped corrugations expanded radially outwards from a steel tube, straight cylindrical end portions at each end of the corrugations, and integral with the corrugations, a plurality of longitudinal slits with parallel sides, terminating at each end in rounded fillets, the slits extending through the top of each expanded projection, and being aligned with slits in adjacent projections, the steering assembly comprises an upper and a lower steering column shaft axially slidably engaging each other, an upper jacket tube rotatably supporting said upper steering column shaft and axially slidably supported by a portion of the vehicle, a lower jacket tube mounted to the upper jacket tube at one end and to a portion of the vehicle at the other end, said lower jacket tube including the impact absorbing means, the lower steering column shaft being rotatably supported by the lower jacket tube adjacent to the other end and having universal joint means between the supported portion and steering gear means connected to the lower end thereof, whereby impact energy is absorbed by sequential plastic deformation of each projection when an axial compressive force, caused by the human body, is applied to the upper steering column shaft.

References Cited

UNITED STATES PATENTS

| 2,927,953 | 3/1960 | Staller. | |
| 3,167,974 | 2/1965 | Wilfert. | |
| 3,307,868 | 3/1967 | Blank | 293—70 |
| 3,308,908 | 3/1967 | Bunn | 188—1 |
| 3,369,634 | 2/1968 | Bazelsky | 74—492 |
| 3,373,629 | 3/1968 | Wight et al. | 74—492 |
| 3,373,630 | 3/1968 | Heurtebise | 74—492 |
| 3,394,612 | 7/1968 | Bogosoff et al. | 74—492 |
| 2,836,079 | 5/1958 | Salch | 74—493 |
| 3,394,613 | 7/1968 | Curtindale | 74—492 |
| 3,412,628 | 11/1968 | DeGain | 74—492 |

KENNETH H. BETTS, Primary Examiner

U.S. Cl. X.R.

180—82, 91; 280—87; 293—52